United States Patent [19]

Lundquist et al.

[11] Patent Number: 4,650,730

[45] Date of Patent: Mar. 17, 1987

[54] BATTERY SEPARATOR

[75] Inventors: Joseph T. Lundquist, Jessup; Christian B. Lundsager, Ashton, both of Md.; Nigel I. Palmer, Lexington, Mass.; Howard J. Troffkin, Potomac, Md.

[73] Assignee: W. R. Grace & Co., New York, N.Y.

[21] Appl. No.: 734,431

[22] Filed: May 16, 1985

[51] Int. Cl.$^4$ ............................................. H01M 10/50
[52] U.S. Cl. ...................................... 429/62; 429/145
[58] Field of Search .................................. 429/62, 145

[56] References Cited

U.S. PATENT DOCUMENTS

| | | | |
|---|---|---|---|
| 4,075,400 | 2/1978 | Fritts | 429/62 |
| 4,351,888 | 9/1982 | Dampier et al. | 429/62 |
| 4,407,910 | 10/1983 | Catanzarite | 429/62 |

*Primary Examiner*—Donald L. Walton
*Attorney, Agent, or Firm*—Howard J. Troffkin

[57] ABSTRACT

A multiply sheet product useful as a battery separator having at least two plies each in the form of a microporous sheet of predetermined length and breadth and a thickness of less than 10 mils wherein (a) at least one of said ply being a sheet capable of transforming to a substantially non-porous membrane at a temperature between about 80° and 150° C. while essentially maintaining its length and breadth dimensions and (b) at least one ply being a sheet capable of maintaining its dimensions and porosity at temperatures from ambient to at least about 10° C. greater than the transformation temperature of sheet (a).

30 Claims, No Drawings

BATTERY SEPARATOR

BACKGROUND OF THE INVENTION

The subject invention is directed to a sheet product which is useful as separators in batteries, in particular, separators in lithium batteries to prevent the occurence of overheating and thermal-runaway.

Storage batteries have at least one pair of electrodes of opposite polarity and, generally, have a series of adjacent electrodes of alternating polarity. The current flow between these electrodes is maintained by an electrolyte which can be acid, alkaline or substantially neutral depending on the nature of the battery system. Separators are located in the batteries between adjacent electrodes of opposite polarity to prevent direct contact between the oppositely charged electrode plates while freely permitting electrolytic conduction. The separator is normally in the form of a thin sheet or film or in certain designs can be in the form of an envelope surrounding each electrode plate of one polarity. It is generally agreed that separators should be (a) thin and light weight to aid in providing a battery of high energy density, (b) resistant to degradation and instability with respect to the battery components with which it is in contact, (c) capable of exhibiting a high degree of electrolytic conductivity (low electrolytic resistance) and (d), in battery systems where appropriate, capable of inhibiting formation and growth of dendrites.

Lithium batteries have distinct advantages over other storage batteries. These batteries are capable of providing much higher power storage densities than other types of batteries, excellent shelf life, high energy density (power capability per unit weight) due to the low atomic weight of lithium metal, and high potential for forming a battery in conjunction with positive electrodes far removed from the lithium electrode in the electromotive series. The battery can be formed in any conventional physical design-cylindrical, rectangular or disc-shaped "button" cells—normally of a closed cell configuration. Such batteries are generally composed of a negative lithium electrode, a positive electrode and a non aqueous electrolyte. The negative electrode is conventionally lithium metal or its alloy on a support, such as a nickel coated screen. Positive electrodes of various types have been suggested, including metal oxides such as manganese dioxide or transition metal sulfides such as sulfides of cobalt, nickel, copper, titanium, vanadium, chromium, cerium and iron. The positive electrode may further contain carbon and a current collector. The electrolyte is formed of a non aqueous solvent containing a lithium salt. For example, solvents may be acetonitrile, tetrahydrofuran, propylene carbonate, and various sulfones. The lithium salts may be lithium perchlorate, iodide or hexafluroarsenate and the like. An additional, normally passive, component of the battery is a separator membrane located between plates of opposite polarity to prevent contact between such plates while permitting electrolytic conduction.

Separators conventionally used in present battery systems are formed of polymeric films which when placed in an electrolyte or electrolyte system, are capable of exhibiting a high degree of conductivity while being stable to the environment presented by the battery. The films may be macroporous or microporous to thus permit transporation of electrolyte. Examples of such separators include polypropylene sheet which has been stretched and annealed to provide microporosity in the sheet. Such sheets are normally highly oriented and shrink when subjected to heat. Other examples are filled polymeric sheets such as those disclosed in U.S. Pat. Nos. 3,351,495 and 4,287,276 in which the electrolyte is capable of passing through the separator through microporous channels and by the wicking of the filler.

Due to the reactivity of lithium, a major problem encountered with these batteries involves overheating of the cell due to improper use of the cell, e.g. placed in inverted position causing plating out of electrolyte onto an anode; contact between electrodes of opposite polarity such as by dendrite formation or shrinkage of separator; formation of high surface spongy lithium which exothermally reacts with the solvent-electrolyte; as well as other known conditions. Such overheating tends to cause thermal runaway and potentially explosive effects as the system continues to act in its defective mode. This must be controlled to provide a battery having commercial acceptability.

Polymeric films presently employed as separators in lithium batteries are generally not capable of preventing any uncontrolled overheating. Some separator films are inert to heat and, therefore, do not trigger any preventative mechanism. Other presently used separators, such as microporous polyolefins, when subjected to elevated temperatures exhibit dimensional instability and/or degradation permitting contact between electrodes of opposite polarity. Such instability only accelerates the thermal-runaway of a battery.

SUMMARY OF THE INVENTION

The present invention is directed to a sheet product having at least two plies coextensively bonded together, to provide a product capable of exhibiting low electrolytic resistivity at normal operating temperatures and when subjected to a predetermined elevated temperatures, to irreversibly transform to a product having high electrolytic resistivity while maintaining its overall length and breath dimensions.

DETAILED DESCRIPTION OF THE INVENTION

The sheet product of the present invention, in addition to exhibiting conventionally desired properties for use as a battery separator as described above, is uniquely suitable for use as a separator in lithium batteries as a means of reducing or stopping the electrochemical activity of the battery cell when encountering elevated temperatures. This unique feature provides the ability to produce a lithium battery having an internal means to prevent undesired thermal-runaway and/or explosive reaction.

For purposes of clarity some of the terms used herein and in the appended claims to describe the instant invention are defined herein below:

A "sheet" is intended to define a unitary article having a large surface with respect to its length and breath and having a thickness of about 0.025 cm. or less, preferably less than about 0.01 cm.

A "ply" is a sheet which is microporous and is a component of a sheet product.

A "sheet product" is intended to define a multiply structure formed from (a) at least one ply capable of transforming to a substantially non-porous membrane at a predetermined temperature selected between about 80° C. and 150° C. and (b) at least one ply capable of maintaining its dimensions and porosity at temperatures of from ambient to at least about 10° C. greater than the transformation temperature of ply (a); all plies are bonded together to form a unitary structure which is capable of maintaining its length and breath dimensions.

The term "first" is intended to modify terms to reference them to ply (a) of a sheet product, or sheets, materials or components used to form a ply (a).

The term "second" is intended to modify terms to reference them to ply (b) of a sheet product, or sheets, materials or components used to form a ply (b).

The term "polymer composition" is intended to refer to a thermoplastic polymer which may contain substantially uniformly distributed therein other material such as plasticizer, antioxidants, solid particulate fillers and the like.

The term "fluidity" is intended to refer to the ability of a polymer composition to flow, that is to have polymer molecules of the composition capable of sliding over one another. This ability will depend upon the polymer's particular configuration, i.e. linear or branched, crystalline or amorphous, degree of crosslink, temperature of the composition and the like. The fluidity can be measured by conventional techniques such as using Standard Load Melt Index or High Load Melt Index tests (ASTM D-1238-57T) modified to be measured at varying temperatures.

The term "viscosity" is intended to refer to the ability of a polymer composition to resist flow. Viscosity is inversely related to fluidity.

A "separator" is a component of a battery, in particular a storage battery, by which the component maintains a separation between adjacent electrode plates of opposite polarity. A separator of the present invention is formed from a sheet product and may be in various configurations such as, flat, ribbed, corrugated sheet product in the form of a membrane or envelope capable of maintaining separation between electrodes.

The multiply sheet product of the present invention must be composed of (a) at least one first ply in the form of a microporous sheet of a predetermined length and breath and of a thickness of less than about 10 mils (0.025 cm) preferably less than 5 mils (0.013 cm) and most preferably from 0.1 to 4 mils. The pores of the sheet must be of sufficient size and amount to permit the resultant sheet product of the present invention to exhibit low electrolytic resistivity i.e. 500 ohm-cm or less depending on the particular application. It is understood that the thinner the sheets dimensions are, the lower the overall volume percent of the sheet needs to be occupied by the pores to sustain the desired low electrolytic resistance. The pores of the first ply will normally have average pore size of from about 0.005 to about 5 microns in diameter and the pores normally occupy at least about 10 volume percent and preferably at least about 25 volume percent of the total volume of the sheet. The first sheet is formed of a composition capable of transforming to a substantially non-porous membrane sheet at a predetermined temperature within the range of from about 80° to 150° C. while substantially maintaining its predetermined length and breath dimensions when a component of the multiply sheet product; and (b) at least one second ply in the form of a microporous sheet of a predetermined length and breath and a thickness of less than 10 mil (0.025 cm), preferably less than 5 mils (0.013 cm) and most preferably from 1 to 4 mils (0.025–0.01 cm) having average pore size of from about 0.005 to about 5 microns in diameter wherein the pores occupy at least about 25 volume percent and preferably at least about 40 volume percent of the sheet's volume and the sheet is substantially stable (minor shrinkage of less than 10 percent may occur over conventional battery life and can be accommodated for in initial design) in form and dimensions at temperatures ranging from ambient to at least about 10° C., preferably at least 20° C. greater than the transformation temperature of sheet (a).

The transformation temperature of a sheet materials is the temperature at which the sheet, when in a battery cell, exhibits a large increase in electrolytic resistivity to provide resistivity sufficient to substantially shut down a battery system or a portion of such a system (for example one cell or a localized portion to prevent undesired thermal runaway. Electrolytic resistivity of at least about 1500 ohm-cm is normally sufficient to shut down a battery system although greater or lesser resistance may be sufficient for a particular battery or for a particular application. The transformation temperature substantially coincides with the temperature at which the composition of the first ply exhibits sufficient fluidity and ability to collapse into its pores to provide a substantially non-porous membrane while a component of the sheet product.

The microporous sheets forming (a) and (b) are each formed from polymeric compositions. The polymer matrix must be selected from polymers which are inert under the conditions encountered in a battery especially with respect to the electrolyte composition. In addition, each polymer composition must be capable of exhibiting microporosity and must also be capable of being formed into a thin sheet of less than 10 mils preferably less than 5 mils and most preferably less than 4 mils. With respect to the first ply, it may be in the form of a sheet or, alternately, a thin coating of from about 0.01 to 4 mils contained on ply (b). Ply (b), in turn, is of equal or greater thickness than that of the first ply and, most preferably has a thickness ranging from about 1 to 4 mils.

The first ply is formed from a polymeric composition comprising a polymer, as described fully herein below, and may, in addition, have uniformly distributed therein plasticizers, stabilizers, antioxidants and the like for said polymer. The polymer composition used to from a first ply should contain substantially no particulate filler although small amounts of up to about 15 weight percent, preferably less than 10 weight percent may be contained in the compositions as residue from processing and formation.

The second ply is formed from a polymeric composition comprising a polymer, as described fully herein below, and, in addition, may have uniformly distributed therein plasticizers, stabilizers, antioxidants and the like and, preferably contains a large (greater than 20) weight percentage of solid, particulate filler.

The sheet products of the present invention utilize first and second polymeric compositions which have different profiles of viscosity and flow with respect to temperature. These properties can be readily determined by known methods such as by a modified Standard Load Melt Index or High Load Melt Index test to make the determinations over a range of temperature, particularly a range of from 80° to 150° C. The viscosity of the composition forming the first ply should be substantially equal to or less than that of the composition of the second ply at all temperatures. It is understood that both the first and second polymer compositions exhibit very high viscosity at low and moderate temperatures where they are solid materials. At these temperatures, both solid compositions have substantially equal (approach infinite values) viscosities as they do not exhibit any pronounced flow. However, at some predetermined elevated temperatures of from about 80° C. or greater, as directed by the application for the sheet product, the ply formed from the first polymeric composition must be capable of having a sufficient change in viscosity (decrease) or released elastic energy (exhibiting plastic memory) to exhibit flow and ability to collapse into its pores. This temperature is the transformation temperature of the first composition. At this transformation temperature, the second polymer composition must maintain sufficient high viscosity and thus retain its elastic energy, i.e. show substantially no flow.

The present sheet product has been found useful as a battery separator for lithium type batteries because, in addition to exhibiting the normally desired electrolytic conductivity at operating temperatures, it is capable of irreversibly transforming to a sheet product having high electrolytic resistivity at an elevated temperature of at least about 80° C., preferably from about 80° to 150° C. while maintaining its overall length and breadth dimensions.

The polymeric compositions useful in forming each of the sheets of the multiply sheet product of the present invention can be selected from known classes of polymers capable of forming a microporous sheet such as, for examples, polyolefins, polysulfones, polyvinyl chloride, polyvinyl fluoride, polytetrafluoroethylene-propylene copolymers, polyamides, polyphenyleneoxide-polystyrene copolymers, polycarbonates and the like. The polymers used to form the first and second sheets of the multiply sheet product are preferably selected from the same class of polymeric material to best provide the properties described above.

A preferred class of polymers are the polyolefins due to their inertness with respect to the other battery components with which they come in contact. The remainder of this description shall illustrate the present invention by combinations of the most preferred embodiment wherein polyolefin compositions are used to form the present sheet materials and separators therefrom. It has been found that when forming a product having at least one first ply of an unfilled microporous polyolefin composition which normally exhibits the undesired properties of shrinkage in length and breath in combination with at least one second ply of a higher viscosity profile polyolefin composition (most preferably a filled polyolefin composition) one unexpectedly attains a product of low transformation temperature while exhibiting and maintaining high stability.

The instant invention is directed to a multiply sheet product in which the plys are formed from at least two different classes of sheet materials.

A polymer composition found useful to form a second ply of the subject sheet product and separators formed therefrom are a substantially homogeneous admixture of from 5 to 30 weight percent of polyolefin, from 10 to 60 weight percent of a plasticizer for the polyolefin and from 30 to 75 weight percent of a particulate filler. The preferred range of each component, respectively, is: 10 to 20; 20 to 40; and 45 to 65.

The second polyolefin should have a high weight average molecular weight of at least 100,000 and can be selected from polyolefins having weight average molecular weight of from 100,000 to about 2,000,000. The second polyolefin can be selected from homopolymers such as polyethylene or polypropylene or from copolymers formed from a mixture of hydrocarbon olefinic monomers, such as ethylene, propylene, butene and the like, or from a mixture of at least 90 percent by weight of hydrocarbon olefinic monomer with other olefinic monomer, such as acrylic acids and esters, vinyl acetate, styrene and the like. This polyolefin can also be formed from a mixture of a high molecular weight and a low molecular weight polyolefin. The mixture can be formed from about 5 to 95 weight percent high molecular weight polymer (at least about 500,000 weight average molecular weight) with the corresponding about 95 to 5 weight percent of low molecular weight polymer (weight average molecular weight of from 100,000 to 500,000). It is preferred that the lower molecular weight polymer be the major component of the polyolefin mixture. When only one polyolefin is used in forming the second sheet, the weight average molecular weight of the polyolefin component should preferably be greater than 150,000 and, more preferably, greater than 200,000.

The second plasticizer can be soluble or insoluble in water. Representative of the water-insoluble plasticizers are organic esters, such as the sebacates, phthalates, stearates, adipates, and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; low molecular weight polymers such as polyisobutylene, polybutadiene, polystyrene, atactic polypropylene, ethylene-propylene rubber; ethylene-vinyl acetate copolymer, oxidized polyethylene, coumarone-indene resins and terpene resins; tall oil and linseed oil. Illustrative of the water-soluble plasticizers useful as first plasticizers are ethylene glycol, polyethylene glycol, polypropylene glycol, glycerol, and ethers and esters thereof; alkyl phosphates such as triethyl phosphate; polyvinyl alcohol, polyacrylic acid and polyvinyl pyrrolidone. In addition, there are a number of useful water-insoluble, normally solid plasticizers. Typical examples of these plasticizers are polyisobutylene, polybutadiene, polystyrene, atactic polypropylene, ethylene-propylene rubber, and ethylene/vinyl acetate copolymer. Generally, when this type of plasticizer is used, it can be included into the composition forming the second sheet material in an amount as high as 40 percent by volume of the second sheet's composition.

The filler used in forming the second sheet should generally be a high surface area particulate material. The particle size of the second filler should be less than about 0.01 cm and preferably less than about 0.0025 cm in diameter. The surface area of the filler may be from about 1 to 950 square meters while 10 to 500 square meters per gram is preferred. The pore volume (BET) of the filler is preferably at least about 0.07 cc/gm with from 0.07 to 0.8 cc/gm being most preferred.

The second filler and second plasticizer must have distinctly different solubilities taking into account the solvent intended to be used to remove the plasticizer from the formed sheet as more fully described below. The second filler may be soluble or insoluble in water. Representative of particulate filler material which are insoluble in water and which may be used, singly or in combination, to form the first sheet are carbon black, coal dust and graphite; metal oxides and hydroxides such as those of silicon, aluminum, calcium, magnesium, barium, titanium, iron, zinc, and tin; metal carbonates such as those of calcium and magnesium; minerals such as mica, montmorillonite, kaolinite, attapulgite, asbestos, talc, diatomaceous earth and vermiculite; synthetic and natural zeolites; portland cement; precipitated metal silicates such as calcium silicate and aluminum polysilicate; alumina silica gels; wood flour, wood fibers and bark products; glass particles including microbeads, hollow microspheres, flakes and fibers; and salts such as molybdenum disulfide, zinc sulfide and barium sulfate.

Illustrative of the water-soluble fillers are inorganic salts such as the chlorides of sodium, potassium, and calcium; acetates such as those of sodium, potassium, calcium, copper and barium; sulfates such as those of sodium, potassium and calcium; phophates such as those of sodium and potassium; nitrates such as those of sodium and potassium; carbonates such as those of sodium and potassium.

In addition to the above combination of polyolefin-plasticizer-filler, the mixture used to form the second sheet may contain conventional stabilizers, antioxidants, additives and processing aids as known to those skilled in the art. Representative of the stabilizers include 4,4-thiobis (6-tert-butyl-m-cresol), 2,6-ditert-butyl-4-methylphenol and the like. Representatives of antioxidants include hydroquinone and the like. Representatives of other additives include conductive carbon black which may have high surface area (1000 $m^2$/gm) and the like. Representatives of processing aids include zinc stearate and the like. The processing aids, stabilizers antioxidants are used in conventional low amounts such as up to about 2 percent. The conductive carbon black additive may be used in up to 10 percent by weight.

A preferred composition useful in forming the second sheet comprises from 10 to 20 weight percent of a polyolefin, in particular a high density polyethylene or a polypropylene having a high degree of crystallinity, preferably of at least about 30 and most preferably at least about 50 percent crystallinity; from 20 to 40 weight percent of a petroleum oil; and from 45 to 65 weight percent of a first filler selected from carbon or a metal oxide or hydroxide such as those of silicon, aluminum, calcium, magnesium and titanium and mixtures thereof.

The sheet product of the present invention must also have a first ply capable of transforming to a substantially non-porous membrane which is superimposed and bonded to the second ply described above. This ply can be first formed as a separate sheet or can be formed while part of a multi-ply structure or can be formed as a coating on a second sheet which may or may not require further treatment. The particular mode depends on the particuilar polymer composition used, the desired thickness of the first ply and the bonding abilities of the compositions as can be readily determined. The resultant first ply is a substantially unfilled microporous sheet of less than about 10 mils (0.025 cm) thickness.

One method of forming the first ply is by initially forming a filled sheet material similar to that described above for the second sheet. The first sheet is initially a substantially uniform mixture of polyolefin and plasticizer or polyolefin, plastilcizer and filler in amounts within the ranges described above for the second sheet. The first and second sheets are bonded together and a substantial portion, if not all, of the plasticizers and filler are removed. The second polyolefin can be substantially the same as described above with respect to the second polyolefin or may be a low density polyethylene or an atactic, isotactic or syndiotactic polypropylene.

Therefore, in general, the polyolefin used in forming both the first and second sheets may be high density, highly crystalline, polymers. However, the first polyolefin may also be chosen from low density or low or non-crystalline polymer. The weight average molecular weight of the first polyolefin may be equal to or less than the range described above for the second polyolefin. The particular polyolefin chosen will depend on the temperature at which one desires to have the electrolytic resistivity of the resultant battery markedly increase to cause reduced electrochemical activity therein. However, the fluidity at and below the transformation temperature of the first polyolefin should always be substantially the same or greater (the viscosity is substantially the same or lower) than that of the second polyolefin used in forming a particular sheet product. The first polyolefin most suitable for a particular application can be readily determined by laboratory scale tests.

The plasticizers suitable for use in forming the first sheet are the same as those described with respect to the second sheet herein above. When forming the first sheet from an initially filled sheet the only limitation in selecting the first plasticizer is that (a) it is the same as the second plasticizer or (b) the first plasticizer and the second plasticizer are mutually soluble in a common solvent or in solvents (which is to be used in extraction as described below) which are inert with respect to the first and second polyolefins and the second filler.

The first fillers can be selected from those fillers described above with respect to forming the second sheet. However, the first filler and the second filler must be chosen in a manner so they have distinctly different and separate solubility characteristics. While the selection of the second filler must be done so it is inert with respect to the other components of the battery the first filler must be soluble in a substantial non-solvent with respect to the second filler. This is necessary when forming the sheet product from two filled sheets, wherein it will be required to remove the filler of the first sheet while retaining the filler in the second sheet. Each filler is thus chosen both with respect to end use to be compatable with the other battery components and with respect to solubility to provide a means of removing the first filler while retaining the second filler. In a lithium battery, which has a substantially neutral electrolyte, the second filler can be any of the above described fillers and is preferably the above-described metal oxides or hydroxides, in particular, may be selected from titanium dioxide, calcium oxide, aluminum oxide, calcium hydroxide, or silica or the like while the first filler should be a water soluble, preferably an aqueous acid soluble, filler as described above such as metal chlorides, acetates, carbonates and the like and, in particular, sodium, potassium or calcium carbonate.

The two classes of sheets are separately formed by mixing the selected components for that sheet in any conventional manner to produce a substantially uniform mixture. For example, the components can be premixed at room temperature in a blender and the polyolefin-filler-plasticizer dry blends can then be fluxed in a conventional mixer such as a Banbury mixer or melt homogenized in a conventional two roll mill. After being suitably mixed, each composition is molded or shaped in any conventional manner, such as by extrusion, calendering, injection molding, or compression molding to form separate sheets which can be bonded by use of heated nip rollers or the like.

Where one starts with a multilayer filled sheet material, the sheet product is formed by subjecting the multilayer sheet material to extraction to remove certain components from each layer. The plasticizer is removed from the first and second sheets and, in addition, the filler is removed from the first sheet. The specific extraction procedure and medium(s) employed depend upon the nature of the components to be extracted. For example, if the first and second plasticizer and first filler are soluble in a mutual solvent, a single stage extraction is employed. If the first and second plasticizers are mutually soluble in a common solvent but the filler has dissimilar solvency, a two stage extraction may well be required. The solvent and extraction conditions should be chosen so that the first and second polyolefins and the second filler are essentially insoluble. Numerous extracting solvents are suitable for forming the sheet materials of this invention with the particular solvent depending upon the particular component to be extracted. For example, if petroleum oil is used as the first and/or second plasticizer, the following solvents are suitable to extract it from the multilayer sheet material: chlorinated hydrocarbons, such as trichloroethylene, tetrachloroethylene, carbon tetrachloride, methylene chloride, tetrachloroethane, and the like; hydrocarbon solvents such as hexane, benzene, petroleum ether, toluene, cyclohexane, gasoline, and the like. If polyethylene glycol is the plasticizer of the first and/or second sheet material, the extraction medium can be water, ethanol, methanol, acetone, and the like. If finely ground silica is to be extracted, the following solvents are suitable: aqueous or alcoholic sodium hydroxide, potassium hydroxide, and the like or hydrochloric or hydrofluoric acid, can be used to extract metal oxides and metal carbonates.

The conditions under which the extraction is conducted will depend on the particular components. The time of the extraction will vary depending upon the temperature used and the nature of the plasticizer or filler being extracted. For example, when higher temperatures are used, the extraction time for an oil of low viscosity can be less than a minute, whereas if the extraction is performed at room temperature, the time requirement for extraction of a polymeric plasticizer may be in the order of a half hour or even longer. In order to permit easy removal of the first filler, it is preferred that ply or plies of first sheet be outer or surface ply of the sheet product. A multilayer sheet material of two ply (one of the second class and one of the first) or of three ply (one of the first class with two outer sheets of the second class) are, therefore, preferred.

The microporous, substantially unfilled polyolefin sheet comprising the first ply of the subject sheet product can, alternately, be formed in other manners known to those skilled in the art. For example, it is well known that microporous polyolefin sheets, especially polyethylene and polypropylene, can be formed by extruding, as by blown film extrusion method, a film of polyolefin with a rapid drawdown rate and ratio, uniaxially cold stretching the film, such as at a temperature in the range of from about $-20°$ C. to about $25°$ C. below the crystalline melt temperature of the polyolefin to impart microporosity to the film. The resultant microporous sheet may be further processed by hot stretching, in the same direction as it was cold stretched, the previously cold stretched film at a temperature normally from about $25°$ C. below to $5°$ C. below the crystalline melt temperature. The formed microporous sheet is normally annealed by exposing the sheet under tension without stretching to a temperature normally ranging from about $40°$ C. below to about $5°$ C. below the sheets crystalline melt temperature. The resultant sheet may be further treated to increase its wetting properties in manners known in the art. Sheets formed in this manner are non-filled microporous polyolefin, preferably of polyethylene or polypropylene (most preferably, polypropylene), which normally exhibit crystallinity of at least about 30 and preferably at least about 50 percent, an average pore size of from about $10^{-6}$ cm to about $10^{-4}$ cm and a void volume of about 20 to 45 percent. Various modifications for forming microporous polyolefin sheet by extrusion-stretching-annealing processes are described in U.S. Pat. Nos. 3,558,764; 3,679,538; 3,843,761; and 3,853,601, the teachings of which are incorporated herein by reference.

A multiply sheet product having at least one first ply and at least one second ply can be formed in conventional manners such as by coextensively overlaying at least one first sheet with at least one second sheet and subjecting them to nip rollers, calendering or the like. Alternatively, the sheet product can be formed by coating a second sheet with a first composition, normally of polymer and plasticizer, and then removing the first and second plasticizers.

In the instance where one starts with a multilayer sheet material in which the first layer is formed from a preformed substantially unfilled, non-plasticized microporous polyolefin sheet as described above, the subject sheet product is formed by extraction of the plasticizer from the second sheet composed of polyolefin, plasticizer and filler. The extraction can use solvents and conditions described above which provide removal of the plasticizer of the second sheet material while being inert to the polyolefins and filler materials.

The final sheet product is a multiply structure in which all plies of the sheet product are coextensive and bonded together. The most preferred sheet product is composed of two ply. The second ply is most preferably a highly filled polyolefin in which substantially all of the plasticizer has been removed. Normally, the extracted second ply has polymer/filler/plasticizer in wt. percent of 7-35/50-93/0-15. The first ply is most preferably composed essentially of polyolefin. When initially formed from a filled and/or plasticized polymer composition, it may contain residual amounts (10% or less) of the filler and of the plasticizer.

The exact final composition of each ply will depend on the original composition. Each ply exhibits microporosity. The size of the pores of the present sheet product have a substantial proportion which are less than of 0.5 micron diameter (Mercury Intrusion Method) and are generally tortuous in nature.

The resultant sheet products have been found to be capable of exhibiting inhibition to dendrite growth, high conductivity at ambient temperatures, capability to be formed into a very thin sheet products, and stability to the environment produced by and components of the battery. In addition, the present sheet products are dimensionally stable and do not exhibit unacceptable and detrimental shrinkage in its length and breath dimensions when subjected to elevated temperatures. The sheet product, therefore, when used as a separator does not permit contact of electrodes even at temperatures where conventional polyolefin separators would degrade and/or shrink.

It has further been unexpectedly found that separators formed from the present sheet product has the ability to drastically reduce its degree of porosity. The reduced porosity causes a "shut-down" of the battery's electrical system by being a barrier to the passage of ions in the electrolyte between electrodes of opposite polarity. This "shut-down" ability can, in lithium batteries, act as a "safety switch" which in effect, turns off the circuit prior to harm being done through thermal runaway or explosion of the defective battery.

The following examples are given for illustrative purposes only and are not meant to be a limitation on the invention described herein and in the claims appended hereto. All parts and percentages given below are by weight unless otherwise stipulated.

EXAMPLE I

A two ply sheet product was formed and used as a separator in an environment simulating a lithium battery system. A second ply of the sheet product was formed by initially introducing into a Brabender Plastograph mixer 6% of commercially available high density polyethylene (MW of 250,000) and 29% of low aromatic, saturated hydrocarbon petroleum oil (Shellflex 411; 547 SSU at 100° F.) and 0.1% of Santonox followed by 52.7% of titanium dioxide (Unitane OR-573; BET surface area 53 $m^2$/gm). Finally, 2% carbon black (Vulcan XC-72) and 0.2% zinc stearate are added. After complete addition of the components, they were compounded in the mixer at 175° C. for about 15 minutes. The resultant composition was removed from the mixer, cooled, and ground to a coarse powder in a Wiley mill. The powder was fed into a one inch single screw extruder, operated at 175° C., and extruded through two 40 mesh (U.S. Standard) screens to remove any large aggolmerates and pelletized. The pellets were subjected to a second extruder similar to the first, except that it was equipped with a two inch tubing die and formed into a blown film of approximately 0.005 to 0.0075 cm thick.

A first ply of the sheet product was formed in the same way as described above for the second ply except the materials used were 17.9 parts of a commercially available high density polyethylene (MW of 250,000), 14.1 parts of low aromatic saturated petroleum oil (Shellflex 411), 61.3 parts of finely ground calcium carbonate, 4.7 parts of titanium dioxide (Unitane OR-573), 1 part zinc stearate and 0.01 part of an antioxidant Santonox.

The first and second sheet materials formed above were superimposed and pressed (110 psi) together at 150° C. for about one minute to form a bonded sheet product. The 2 ply sheet product was immersed in 1,1,1-trichloroethane for about 30 minutes and air dried. Samples of the extracted sheet separator were analyzed and showed that greater than 90 percent of the plasticizer was removed. The sheet product was then wet with acetone and immersed in a dilute hydrochloric acid solution for about 30 minutes to remove substantially all of the calcium carbonate from the first sheet.

The resultant sheet product was subjected to propylene carbonate at various temperatures. Propylene carbonate is a typical electrolyte composition carrier used in lithium batteries and therefore exemplifies a battery environment to which separators are exposed. The exposed sheet product was subsequently tested for electrolytic resistance (ER) in 33 wt % KOH solution according to the ER determination described in Cooper and Fleischer, "Characteristics of Separators for Alkaline Silver oxide, Zinc Secondary Batteries: Screening Methods" Air Force Aero Propulsion Laboratory, September, 1965. The results were: 15 ohm-cm at 25° C.; 14.7 ohm-cm after exposure at 110° C.; and greater than 4000 ohm-cm after exposure at 135° C. The separator formed from the prepared sheet product exhibited a large electrical resistance capable of shutting down a battery system when exposed to a temperature between 110° C. and 135° C.

EXAMPLE II

A separator capable of exhibiting very high resistivity upon exposure to heat was prepared from a 2 ply sheet product. The second ply was formed in the same manner as described for the second ply of Example I above.

The first ply was formed in the same manner as the first ply of Example I except that the components were 22.9 parts of a commercial low density polyethylene (DYNH-1) 57.2 parts calcium carbonate (Baker Reagent Grade) 18.8 parts of low aromatic petroleum oil (Sunthene 255) with 0.1 part Santonox and 1 part zinc stearate. The pelletized material was pressed between Teflon sheets at 150° C. and 1000 psi for about 5 minutes to form a first sheet material 3.1 mil (0.0079 cm) thick.

The first and second sheet materials were superimposed and pressed between heated plates (125° C. at 110 psi) to form a bonded sheet product and then subjected to the extraction steps described in Example I above.

The thickness of the 2 ply sheet product was 5.1 mil (0.013 cm) (2 mil (0.005 cm) first ply and 3.1 mil (0.0079 cm) second ply) which upon exposures above 110° C. reduced to a thickness of 3.7 mil (0.0094 cm) while exhibiting essentially no reduction in the sheet products length and breath dimensions. The separator formed from the sheet product exhibited an ER-temperature profile as follows: 103 ohm-cm at 22° C.; 149 ohm-cm after exposure at 100° C.; greater than 3400 ohm-cm after exposure at 110° C.; and greater than 3400 ohm-cm after exposure at 120° C.

EXAMPLE III

A separator capable of exhibiting very high resistivity upon exposure to heat was prepared from a 2 ply sheet product. The second ply was formed in the same manner as described for the second ply of Example I above.

The first ply was a commercial non-filled microporous polypropylene sheet believed formed by blown film extrusion to produce a non-porous crystalline film which was sequentially cold stretched, hot stretched and annealed to provide its microporous character (Celanese Corp, Celguard 3401).

The first and second sheets were laminated together by pressing at elevated temperature for 20 seconds at 140 psi to form a bonded sheet product.

The plasticizer was extracted from the second sheet material by immersing the sheet product into 1,1,1-trichloroethane for 30 minutes and drying. The resultant sheet product, when tested as a battery separator as described in Example I above exhibited an ER- temperature profile as follows: 27 ohm-cm at ambient temperature; 28 ohm-cm after exposure at 100° C.; 36 ohm-cm after exposure at 110° C., 31 ohm-cm after exposure at 120° C. and 2000 ohm-cm after exposure at 140° C.

What is claimed is:
1. A sheet product having at least two plies comprising:

(a) at least one first ply in the form of a microporous sheet having pores of average pore size of from about 0.005 to about 5 microns in diameter and the pores occupy at least about 10 volume percent of the total volume of the first ply and of a predetermined length and breadth and a thickness of less than 10 mils (0.025 cm), said ply being capable, while a component of the sheet product, of transforming to a substantially non-porous membrane sheet at a transformation temperature of between about 80° C. and 150° C. while substantially maintaining the predetermined length and breadth dimensions; and (b) at least one second ply in the form of a microporous sheet of a predetermined length and breadth and a thickness of less than 10 mils (0.025 cm) having pores of average pore size of from about 0.005 to about 5 microns in diameter wherein said pores occupy at least about 25 percent of the total volume of said sheet, said second ply being capable, while a component of the sheet product of substantially maintaining said microporous structure and said determined length, breadth and thickness at temperatures of from about ambient to at least about 10° C. greater than the transformation temperature of said first ply; each of said first and second ply being bonded together to provide a unitary sheet product.

2. The sheet product of claim 1 wherein the second ply is stable in form and dimensions at temperatures of from ambient to about 20° C. above the transformation temperature of the first ply and the sheet product exhibits an increase in electrolytic resistivity to at least about 1500 ohm-cm. at the transformation temperature of the first ply of said sheet product.

3. The sheet product of claim 2 wherein the first ply is from abut 0.01 to 4 mils thick.

4. The sheet product of claim 2 wherein the first ply and the second ply are each formed from polymer compositions such that the viscosity of the first ply's composition is substantially equal to or less than the viscosity of the second ply's composition at temperatures ranging from ambient to about 150° C.

5. The sheet product of claim 4 wherein each polymeric composition forming a first ply and a second ply comprise polymers selected from the group consisting essentially of polyolefins, polysulfones, polyvinyl chloride, polyvinyl fluoride, polytetrafluoroethylenepolypropylene copolymer, polyamides, ployphenylene oxidi-polystyrene and polycarbonate.

6. A sheet product having at least two plies comprising (a) at least one firat ply in the form of a microporous sheet having pores of average pore size of from about 0.005 to about 5 microns in diameter and the pores occupy at least about 10 volume percent of the total of the first ply and of a predetermined length and breadth and a thickness of less than 10 mils (0.025 cm) composed of a substantially non-filled polyolefin polymer composition; and (b) at least one second ply in the form of a microporous sheet of a predetermined length and breadth and of less than 10 mils (0.025 cm) thickness and having pores of average pore size of from 0.005 to about 5 microns in diameter occupying at least about 25 percent of the total volume of said sheet, said sheet composed of a substantially homogeneous admixture of from about 7 to 40 weight percent of a high density polyolefin having a weight average molecular weight of at least 100,000, from 0 to 10 weight percent of a plasticizer for said polyolefin, and from about 50 to 93 weight percent of an inert particulate filler having a particle size of less than about 0.01 cm;

each of said first and second ply being bonded together to provide a unitary sheet product and the viscosity of the polymer composition of each of said first ply being substnatially equal to or less than that of the polymer composition of said second ply at temperatures ranging from ambient to about 150° C. and, at a transformation temperature of between about 80° and 150° C., being sufficiently decreased to exhibit flow to provide a substantially non-porous sheet while substantially maintaining its predetermined length and breadth dimensions.

7. The sheet product of claim 6 wherein the polyolefin of component (b) is a mixture of from 5 to 95 weight percent of a high molecular weight polyolefin and from 95 to 5 weight percent of a low molecular weight polyolefin and the polyolefin of component (a) is a low density polyolefin.

8. The sheet product of claim 6 wherein the polyolefin of component (b) is selected from a polyethylene or polypropylene having a standard load melt index of less than about 0.5 and the polyolefin of component (a) is selected from a polyethylene or polypropylene.

9. The sheet product of claim 6 wherein the plasticizer of component (b) is selected from a petroleum oil and low molecular weight polymers and mixtures thereof; the filler of component (b) is selected from carbon black, coal dust, graphite, oxides and hydroxides of silicon, aluminium, calcium, magnesium, boron, titanium, or mixtures thereof; and the polyolefin is selected from polyethylene or polypropylene.

10. The sheet product of claim 8 wherein the plasticizer of component (b) is selected from a petroleum oil and low molecular weight polymers and mixtures thereof; the filler of component (b) is selected from carbon black, coal dust, graphite, oxides and hydroxides of silicon, aluminium, calcium, magesium, boron, titanium, or mixtures thereof; and the polyolefin is selected from polyethylene or polypropylene.

11. The sheet product of claim 6 wherein component (b) further has substantially uniformly distributed therein a conductive carbon black in amounts of up to 10 weight percent.

12. The sheet product of claim 7 wherein component (b) further has substantially uniformly distributed therein a conductive carbon black in amounts of up to 10 weight percent.

13. The sheet product of claim 8 wherein component (b) further has substantially uniformly distributed therein a conductive carbon black in amounts of up to 10 weight percent.

14. The sheet product of claim 8 wherein the microporous polyolefin sheet of component (a) is a highly crystalline polypropylene sheet.

15. In a storage battery having positive electrodes, negative electrodes, an electrolytic composition and separators positioned between adjacent electrodes of opposite polarity, wherein the improvement comprises that the separator is a sheet product having at least two plies composed of (a) at least one first ply in the form of a non-filled microporous sheet having pores of average pore size of from about 0.005 to about 5 microns in diameter and the pores occupy at least about 10 volume percent of the total volume of the first ply and of a predetermined length and breadth and a thickness of less than 10 mils composed of a substantially non-filled polyolefin polymer composition; said sheet being capable, while a component of the sheet product, of transforming to a substantially non-porous membrane sheet at a transformation temperature between about 80° C. and 150° C. while substantially maintaining the predetermined length and breadth dimensions; and (b) at least one second ply in the form of a microporous sheet of a predetermined length and breadth and a thickness of less than 10 mils having pores of average pore size of from about 0.005 to about 5 microns in diameter wherein said pores occupy at least about 25 percent of the total volume of said sheet, said second sheet composed of a substantially homogeneous admixture of from about 7 to 40 weight percent of a high density polyolefin having a weight average molecular weight of at least 100,000, from 0 to 10 weight percent of a plasticizer for said polyolefin, and from about 50 to 93 weight percent of an inert particulate filler having a particle size of less than 0.01 cm; each of said first and second ply being bonded together into a unitary sheet product and said second ply being capable while contained in a storage battery, of substantially maintaining said microporous structure and said determined length, breadth and thickness at temperatures of from about ambient to at least about 10° C. greater than the transformation temperature of said first ply.

16. The storage battery of claim 15 wherein the battery has at least one electrode containing lithium.

17. The storage battery of claim 16 wherein the polyolefin of component (b) is a mixture of from 5 to 95 weight percent of a high molecular weight polyolefin and from 95 to 5 weight percent of a low molecular weight polyolefin and the polyolefin of component (a) is a low density polyolefin and wherein component (b) having pores of from about 0.005 to about 5 microns in diameter wherein said pores occupy at least about 25 percent of this total volume of said sheet, and component (a) having pores of average pore size of from about 0.005 to about 5 microns in diameter and the pores occupy at least about 10 volume percent of the total volume of the first sheet.

18. The storage battery of claim 16 wherein the polyolefin of component (b) is selected from a polyethylene or polypropylene having a standard load melt index of less than about 0.5 and the polyolefin of component (a) is selected from a polyethylene or polypropylene.

19. The storage battery of claim 16 wherein component (b) is formed from a plasticizer selected from a petroleum oil and low molecular weight polymers and mixtures thereof; a filler selected from carbon black, coal dust, graphite, oxides and hydroxides of silicon, aluminium, calcium, magnesium, boron, titanium, or mixtures thereof; and a polyolefin selected from a polyethylene or polypropylene.

20. The storage battery of claim 17 wherein component (b) is formed from a plasticizer selected from a petroleum oil and low molecular weight polymers and mixtures thereof; a filler selected from carbon black, coal dust, graphite, oxides and hydroxides of silicon, aluminium, calcium, magnesium, boron, titanium, or mixtures thereof; and a polyolefin selected from a polyethylene or polypropylene.

21. The storage battery of claim 15 wherein component (b) further has substantially uniformly distributed therein a conductive carbon black in amounts of up to 10 weight percent.

22. The storage battery of claim 16 wherein component (b) further has substantially uniformly distributed therein a conductive carbon black in amounts of up to 10 weight percent.

23. The storage battery of claim 17 wherein component (b) further has substantially uniformly distributed therein a conductive carbon black in amounts of up to 10 weight percent.

24. A process of forming a sheet product useful as a battery separator comprising (a) forming a first substantially homogeneous admixture of from 5 to 30 weight percent of a first polyolefin, from about 10 to 60 weight percent of a first plasticizer for said polyolefin and from 30 to 75 weight percent of a first particulate filler; said first plasticizer being soluble in a material which is substantially a non-solvent with respect to the first polyolefin, the second polyolefin and the second filler; said first filler being soluble in a material which is a non-solvent with respect to the first polyolefin, the second polyolefin and the second filler;

(b) forming a second substantially homogeneous admixture of from about 5 to 30 weight percent of a second polyolefin, from about 10 to 60 weight percent of a second plasticizer for said polyolefin and from about 30 to 75 weight percent of a second particulate filler said second polyolefin being selected from high density polyolefins having a weight average molecular weight of at least 100,000; said second plasticizer being soluble in a material which is a substantial non-solvent with respect to the second polyolefin and second filler; said second filler having a particle size of less than 0.01 cm, a surface area of from about 10 to 950 square meters per gram and a pore volume of at least about 0.07 cc/gm;

(c) forming a first sheet of less than 10 mils (0.025 cm) thickness from the first substantially homogeneous admixture;

(d) forming a second sheet of less than 10 mils (0.025 cm) thickness from the second substantially homogeneous admixture;

(e) forming a multilayered sheet having at least one layer composed of the first sheet and at least one layer composed of the second sheet, each layer being bonded to, substantially coextensive with and superimposed on the other layers of the multilayer sheet material; and (f) extracting from the multilayer sheet material substantially all of the first and second plasticizers and substantially all of the first filler therein to provide a sheet product.

25. The process of claim 22 wherein the polyolefin selected for forming the first homogeneous mixture, the second homogeneous mixture or both comprises a major amount of a polyolefin having a weight average molecular weight of from 100,000 to 500,000 and a minor amount of a polyolefin having a weight average molecular weight of from 500,000 to 2,000,000 and wherein the olefin of the first mixture are polyethylene.

26. The process of claim 24 wherein the first and second plasticizers are soluble in a common material and wherein said multiply sheet product is contacted with said common material to coextract the first and second plasticizers therefrom.

27. The process of claim 24 wherein the multilayer sheet comprises one layer of a first sheet material and one layer of a second sheet material and wherein said first and second sheets are formed simultaneously by coextrusion.

28. The process of claim 24 wherein the first and the second sheet materials each are formed in a thickness of from about 1 to 4 mils (0.0025 to 0.01 cm) thickness.

29. A process of forming a sheet product useful as a battery separator comprising
 (a) forming a first sheet comprising an unfilled microporous polyolefin composition of less than 10 mils thickness;
 (b) forming a second substantially homogeneous admixture of from about 5 to 30 weight percent of a second polyolefin, from about 10 to 60 weight percent of a second plasticizer for said polyolefin and from about 30 to 75 weight percent of a second particulate filler which is inert with respect to the components of the battery system in which it is to be used; said second polyolefin being selected from high density polyolefins having a weight average molecular weight of at least 100,000; said second plasticizer being soluble in a material which is a substantial non solvent with respect to the second polyolefin and said second filler; said second filler having a particle size of less than 0.01 cm, and surface area of from about 10 to 950 square meters per gram and a pore volume of at least about 0.07 cc/gm; said second composition having a viscosity substantially equal or greater than that of the first composition at temperatures from ambient to about 150° C.,
 (c) superimposing and bonding at least one first sheet onto a second sheet to form a multilayer sheet wherein each layer is bonded to, substantially coextensive with and superimposed on the other layers of the multilayer sheet; and
 (d) extracting from the multilayer sheet material substantially all of the second plasticizer from the second sheet material to provide a sheet product.

30. The process of claim 29 wherein said substantially non-filled microporous polyolefin sheet bonded to said first sheet is formed from polypropylene, exhibits at least about 30 percent crystallinity, has an average pore size of from about $10^{-6}$ cm to about $10^{-4}$ cm and a void volume of at least about 20 percent.

* * * * *